United States Patent [19]
Gauthier et al.

[11] Patent Number: 5,796,930
[45] Date of Patent: Aug. 18, 1998

[54] SYSTEM ARCHITECTURE FOR PROCESSING AND TRANSPORTING PAGE-MAP OR BIT-MAP DATA TO A RASTER PRINT ENGINE

[75] Inventors: Forrest P. Gauthier, Maineville; Dimitrije L. Jovic, Cincinnati, both of Ohio

[73] Assignee: Varis Corporation, Mason, Ohio

[21] Appl. No.: 558,007

[22] Filed: Nov. 13, 1995

[51] Int. Cl.$^6$ ........................................ G09G 5/36
[52] U.S. Cl. .......................... 395/116; 345/509; 345/526; 395/117
[58] Field of Search ..................... 395/101, 107, 395/114–117, 501–503, 506, 509, 511, 518, 521, 526; 345/501–503, 506, 509, 511, 518, 521, 526

[56] References Cited

U.S. PATENT DOCUMENTS

| | | | |
|---|---|---|---|
| 4,965,748 | 10/1990 | Chang et al. | 364/519 |
| 4,992,956 | 2/1991 | Kaku et al. | 364/519 |
| 5,084,831 | 1/1992 | Morikawa et al. | 395/116 |
| 5,113,494 | 5/1992 | Menendez et al. | 395/502 |
| 5,136,688 | 8/1992 | Morikawa et al. | 395/115 |
| 5,150,455 | 9/1992 | Morikawa et al. | 395/114 |
| 5,157,765 | 10/1992 | Birk et al. | 395/506 |
| 5,157,773 | 10/1992 | Matsumoto et al. | 395/375 |
| 5,237,655 | 8/1993 | Statt et al. | 395/504 |
| 5,261,047 | 11/1993 | Rivshin | 395/163 |
| 5,276,799 | 1/1994 | Rivshin | 395/162 |
| 5,303,341 | 4/1994 | Rivshin | 395/162 |
| 5,307,323 | 4/1994 | Fukuda et al. | 365/230.05 |
| 5,307,458 | 4/1994 | Freiburg et al. | 395/162 |
| 5,349,647 | 9/1994 | Freiburg et al. | 395/115 |
| 5,367,673 | 11/1994 | Goldsmith et al. | 395/600 |
| 5,420,696 | 5/1995 | Wegeng et al. | 358/408 |
| 5,509,115 | 4/1996 | Butterfield et al. | 395/118 |
| 5,579,453 | 11/1996 | Lindenfelser et al. | 395/115 |

FOREIGN PATENT DOCUMENTS 0283157  2/1988  European Pat. Off.

Primary Examiner—Kee M. Tung
Assistant Examiner—U. Chauhan
Attorney, Agent, or Firm—Thompson Hine & Flory LLP

[57] ABSTRACT

A digital high-speed printing system architecture for processing contiguous raster-image data blocks for transmission to a marking engine, comprises a central processing unit ("CPU") and at least one video RAM device. Each video RAM device includes a dynamic band RAM, a serial access memory, a random access port for transmitting and receiving image data blocks to and from the dynamic band RAM, and a serial port for transmitting and receiving image data blocks to and from the serial access memory. The video RAM devices perform bi-directional image data block transfers between the dynamic band RAM and the serial access memory. Furthermore, the video RAM devices transfer image data blocks to and from the serial access port, and simultaneously transfer of image data blocks to and from the random access port.

A CPU data bus is coupled between the CPU and the random access port for providing CPU access to the dynamic band RAM, such that the CPU can perform mapping operations on the image data blocks in dynamic band RAM. A dispatch FIFO is coupled to the marking engine; and serial bus is connected between the dispatch FIFO and the serial port, such that image data blocks can be dispatched from the serial access memory to the marking engines over the serial bus. Therefore, the system architecture allows for the dispatching of image data blocks from the serial access memory to be performed simultaneously to the mapping of image data blocks in dynamic band RAM.

20 Claims, 5 Drawing Sheets

SYSTEM ARCHITECTURE FOR PROCESSING AND TRANSPORTING PAGE-MAP OR BIT-MAP DATA TO A RASTER PRINT ENGINE

BACKGROUND

The present invention relates to a system architecture for processing a raster page-map or a bit-map, broken up into image data bands, for a high-speed digital printing system, and more particularly, to a system architecture for mapping and dispatching raster page-map data in which the speed of the raster image processor is optimized.

The printing industry has undergone significant advances in recent years, to the point that a print engine in a high speed printing system now has the capability to print several pages per second. Printing technology has also advanced to the point that printing capabilities are no longer limited by the print engine speed, but rather by the amount of processing time required by the print controllers. Furthermore as the raster printer controllers move into the field of variable data printing, in which each page map shares a common background, and at least one set of image data bits changes for each page, the processing and dispatching times of such page maps becomes increasingly significant.

One known raster printer controller utilizes a massive hard drive in conjunction with its architecture. This controller merges boiler plate bit-map images with variable data for a long period of time, i.e., all night, merging the variable information with the static information, and then stores the processed images in the massive hard drive. This is a continuous operation which is performed until all of the page maps have been generated and stored in the massive hard drive. Subsequently, i.e., the next day, the finished bit-map pages are processed again and dispatched to the print engine. The disadvantages with such a system are that the image bit-map generation must be processed in a non-realtime operation (i.e. overnight); printing and electronic bit-map rendering cannot be performed simultaneously; and the architecture does not lend itself to re-"ripping" (raster image processing) pages while the system is printing. Therefore, it is desirable to have a system architecture which allows for a truly duplex operation, using a single image processor, such that it allows for the modification of page-map data to be conducted simultaneously with the transmission of the processed page-maps to the print engines. It is desired to have a system that can provide real-time processing of variable page images during the printing operation. Furthermore, it is desirable to have a system architecture which allows for the fine-grain banding of the of the page-maps as opposed to the typical software banding techniques.

SUMMARY OF THE INVENTION

The present invention provides a high-speed printer controller architecture which greatly reduces the processing time required to process page-map data with or without variable data fields.

In accordance with the present invention, a printer controller architecture is provided for processing contiguous blocks of raster page-map data ("image data bands") and for eventually transmitting the image data bands to a raster printer engine. The architecture comprises a central processing unit and a dual port memory device. The dual port memory device has a dynamic band RAM, separated into segments, for storing a plurality of image data bands. The dual port memory device also has a serial access memory for storing one image data band, or a fractional envelope thereof.

The system architecture also comprises means, initiated by the central processing unit, for performing logical operations on an image data band in the dynamic band RAM ("MAPPING"); and means, initiated by the central processing unit, for transferring another image data band from the serial access memory to the raster printer engine ("DISPATCHING"). The system architecture is specifically configured to perform the MAPPING and the DISPATCHING operations in parallel.

The system architecture also comprises a memory device for storing a multitude of image data bands; a means, initiated by the central processing unit, for transferring an image data band between the dynamic band RAM and the serial access memory ("PASSING"); a means, initiated by the central processing unit, for transferring an image data band from the memory device to the serial access memory ("LOADING"); a means, initiated by the central processing unit, for transferring an image data band from the serial access memory to the memory device ("STORING"); and a translation look aside buffer for translating a logical address of an image data band in the memory device, sent by the central processing unit, into a physical address of the dynamic band RAM to which that particular image data band has been loaded and delivered. The DISPATCH means is further configured to DISPATCH an image data band from the memory device to the raster printer.

This architecture is specifically configured to allow for the MAPPING of image data bands in band RAM to occur simultaneously with the DISPATCHING of image data bands from the serial access memory to the marking engines, or from the mass storage device to the marking engines. Furthermore, use of this architecture is also specifically configured to allow for the MAPPING of image data bands in band RAM to occur simultaneously with the STORING or LOADING or image data bands.

Accordingly, it is an object of the present invention to provide hardware controlled fine-grained banding mechanism which optimizes the processing speed of page-map images; by eliminating the need to wait for a band to be DISPATCHED, LOADED, or STORED prior to initiating the MAPPING of another data band. It is a further object of the present invention to provide an architecture which allows for the MAPPING of variable data to pre-rendered boilerplate ("pre-ripped") image bands in band RAM, while simultaneously DISPATCHING image data bands which have been MAPPED with variable bit-map data ("ripped" image data bands) to a marking engine, or while simultaneously LOADING pre-ripped image data bands from the mass storage device.

DETAILED DESCRIPTION

The present invention provides a system architecture for processing a raster page-map or bit-map for dispatching to a print engine or marking engine in a high speed printing system. The present invention also provides a computer implemented method for merging variable data into a set of page-map templates in a high speed printing system, utilizing the system architecture of the present invention. This computer implemented method can be for use with the method of implementing variable data fields with a page description language ("PDL"), described in U.S. patent application Ser. No. 08/373,582.

Figure 1:
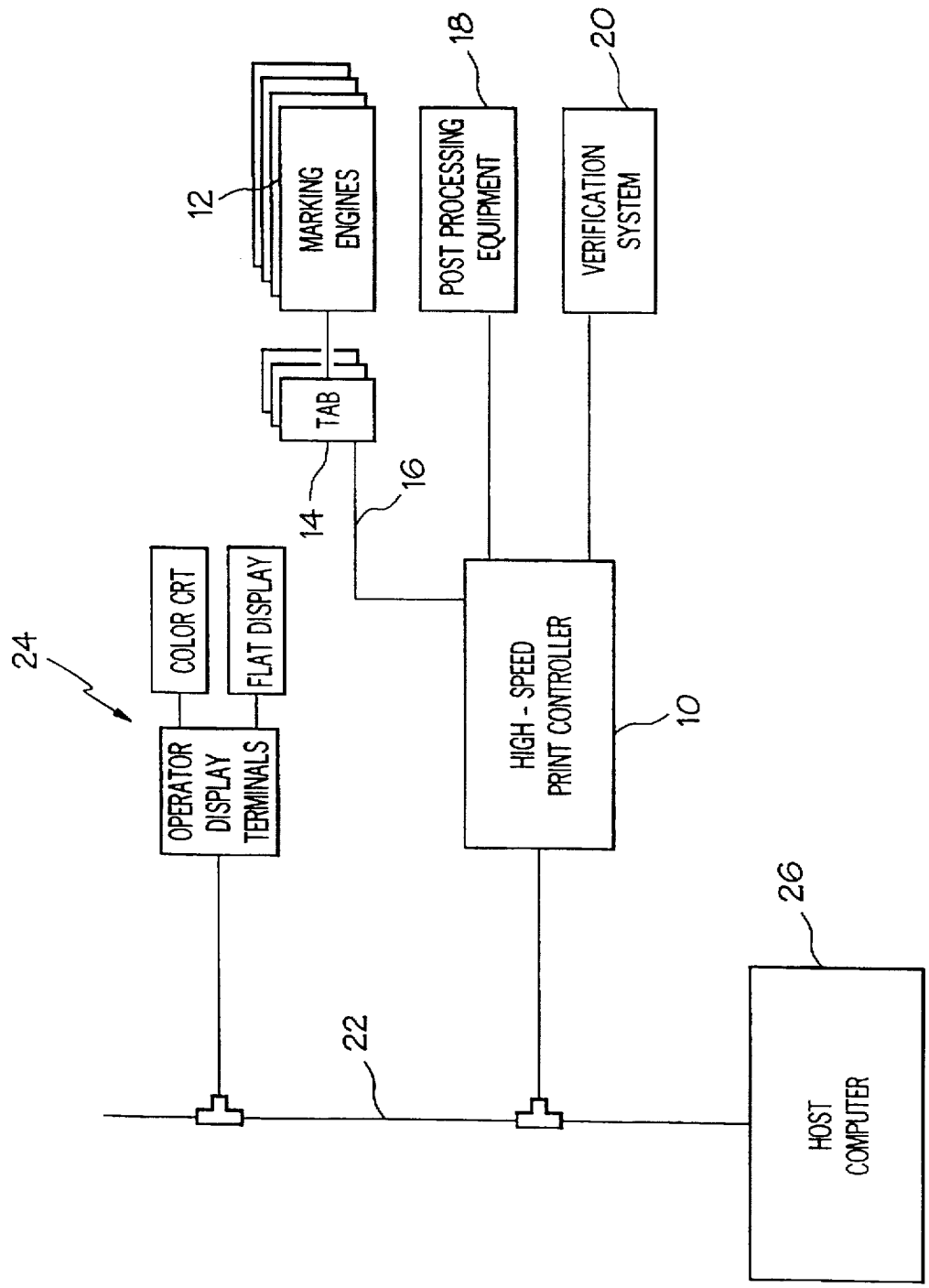
FIG. 1 is a schematic block diagram of a high speed digital printing system for use with the present invention.

As shown in FIG. 1, a typical high speed printing operation for utilizing the present invention includes a high speed print controller 10 for sending processed page-maps or page-map blocks to at least one raster printing marking engine 12. The high speed print controller 10 communicates with the marking engines through a target adapter board 14 ("TAB"). The high speed print controller 10 is a universal print controller, while the TAB 14 is a custom designed circuit board for translating the page-map data generated by the high speed print controller 10 to be acceptable by the various marking engines 12. The TAB 14 is situated between the high speed controller 10 and the marking engines 12 on a data channel, such as a fiber optic data link 16.

The high speed print controller may also have outputs to post-processing equipment 18 and verification systems 20.

The high speed printing system has a communications link, such as an ethernet communications link 22, set up between an operator display 24 and a host computer 26. The host computer 26 provides the files that contain the data that is used by the high speed printing system during the printing operation. The files usually consist of: a job file, the contents of which describe all information needed to run a specific print job; an engine configuration file, the contents of which define parameters of the marking engines; the PDL file(s), the contents of which are the PDL commands (such as Postscript) that define the templates of all the printed pages; and the merge file, the contents of which contains the variable data needed to be merged into the page templates. An optional log file and/or error file, the contents of which consists of system status generated during the processing of the job file, may also be included.

Figure 2:
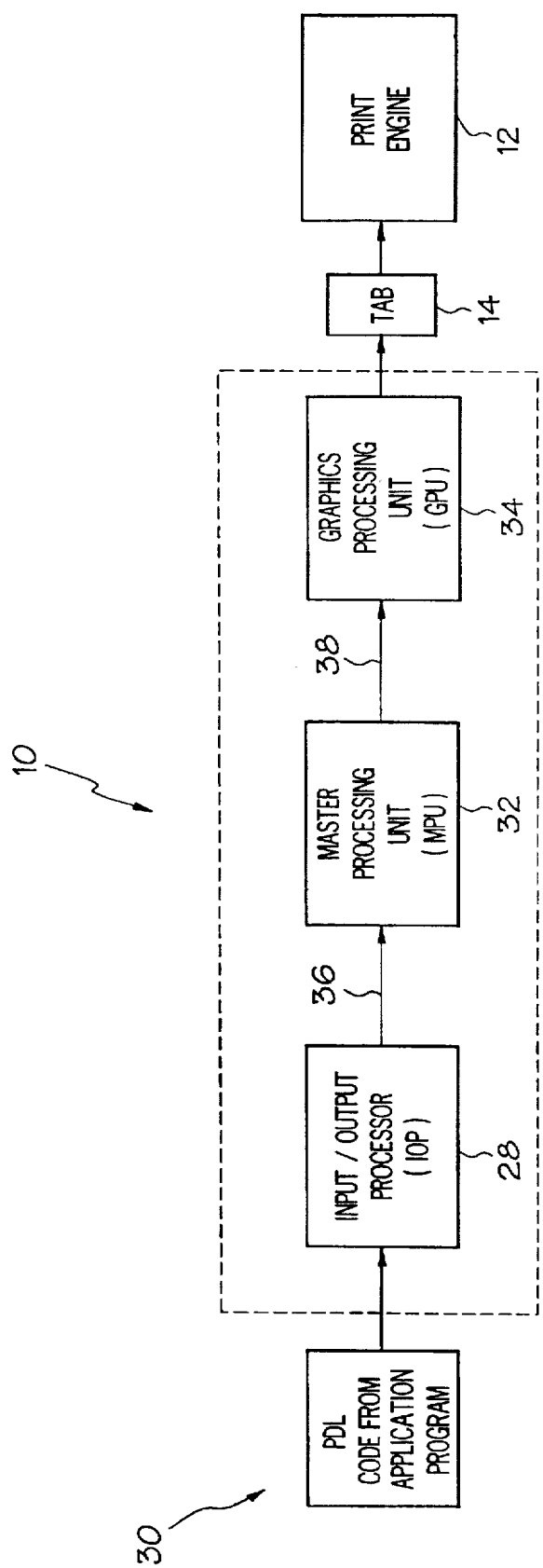
FIG. 2 is a schematic block diagram of a raster image processing system for use with the present invention.

As shown in FIG. 2 the high speed print controller 10 has a series of processing units operating in a pipeline, parallel fashion. The processing units divide the interpreting, rendering and dispatching functions, thereby accelerating the processing and dispatching of the page-maps. The processing units utilize real-time/multi-tasking software which operates asynchronously of the software in the other processing units.

The first processing unit in the pipeline is an input/output processor or "IOP" 28. This processing unit controls the input and output of data for the print operation. The IOP 28 receives a data stream 30 via the ethernet communications link 22. In addition, the IOP 28 may perform optional decompression of the data if it has been transmitted from the host computer in a compressed format.

The IOP 28 is connected to a main processing unit or "MPU" 32 which controls the rendering operations. The MPU 32 interprets the PDL data stream, generates rendering commands and orders the rendering commands as a first stage banding operation.

The MPU 32 is connected to a graphics processing unit or "GPU" 34, containing the architecture of the present invention. The GPU renders the page-maps in accordance to the rendering commands from the MPU 32, and executes the second-stage banding of the page-maps.

The print operation is initiated upon receipt by the IOP 28 of a data stream 30 containing the contents of a page in a page description language ("PDL") such as Postscript. Upon receipt of the data stream 30, the IOP 28 parses the data stream and transmits the resultant data stream 36 to the MPU 32. If the data stream 30 is compressed in order to improve transmission throughput, the IOP 28 may decompress the data stream as it is delivered to the MPU 32.

The MPU 32 processes and interprets the PDL to identify objects such a text characters and symbols, and to obtain information regarding the graphics state or processing environment in which the objects are to be rendered, such as the current font being used, and the current scale and rotation to be applied. As a result of processing and interpreting the PDL, the MPU generates rendering commands which designate the object to be rendered, the graphic state to be applied and the offset address at which the rendered object is to be placed by the GPU into the page-map.

In addition to interpreting the data stream 36, the MPU 28 performs first stage banding, or partitioning the page into a number of non-overlapping geographic regions or bands. The first-stage banding performed by the MPU is a computer implemented method described in detail in the Parent U.S. patent application, Ser. No. 08/379,735.

The GPU 34 accesses the rendering commands 38 sent by the MPU 32 and generates bit-maps for the text characters and symbols in accordance with the graphics state attributes specified in the commands in a conventional manner. In addition to the instructions to the GPU to render and merge an object, the MPU 32 may instruct the GPU 34 to pre-render specific pictures or characters according to the designated graphic state, and store the pre-rendered ("pre-ripped") bit-maps in a separate mass storage device 40 (see FIG. 3) for future processing. When the pre-ripped bit-maps are required, the MPU 32 issues a command to the GPU 34 specifying the address at which to merge the pre-ripped bit-map with a present bit-map in creating the page-map. In accordance with the present invention, the GPU provides an architecture for performing second stage banding operations on the page-map to speed the processing and dispatching of the image.

As mentioned earlier, the MPU 32 performs a first-stage banding of a page. It performs this by defining each drawn entity (such as a font character, glyph, an atomic graphic element) into a rendering command. Rendering commands are then sorted and ordered by geographic location of the drawn entity on the printed page. The rendering commands are ordered from the top of the printed page to the bottom. For example, if the top-most portion of drawn entity "A" is geographically located on the printed page above the top-most portion of the drawn entity "B," then the rendering command representing "A" will be sorted ahead of the rendering command "B." The ordering of the rendering commands provide a coarse, first-stage banding of the printed page.

The ordered rendering commands are then sent sequentially to the GPU 34, where fine-grain (or second-stage) banding is performed. The GPU breaks up the un-ripped "blank page," on which the bit-map of the page will be rendered, into a multitude of bands of memory. The ordered rendering commands cause the GPU to render the bit-map data from the top of the image to the bottom, which is done one band at a time. Note that a bit map for a drawn entity may span more than one image data band. Also involved in the fine-grain banding processes is the transferring or DISPATCHING of the image data bands to the marking engines 12; and the STORING and LOADING of image data bands to and from the mass storage device 40.

Figure 3:
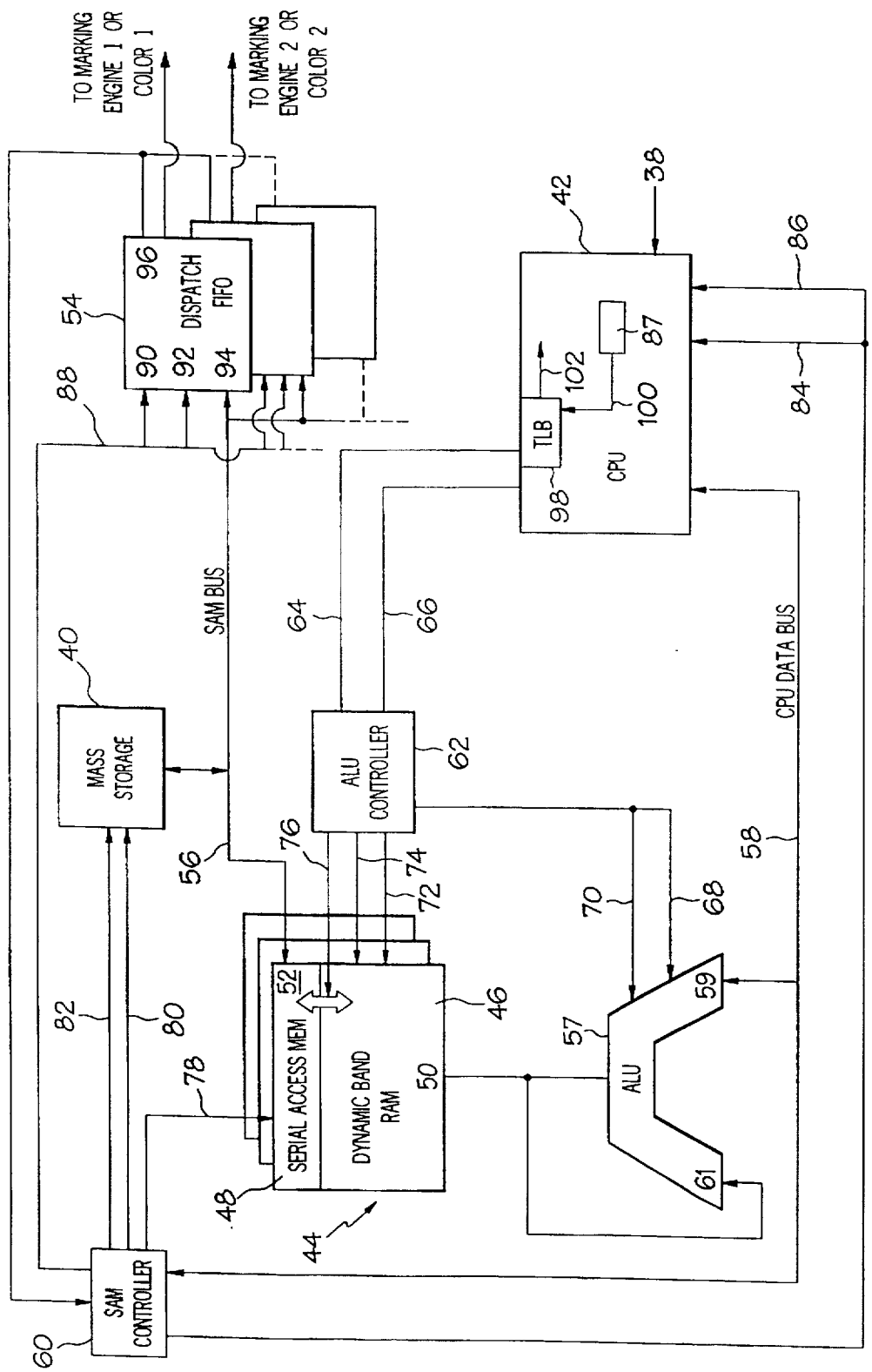
FIG. 3 is a schematic block diagram of the system architecture of the present invention.

As shown in FIG. 3, the main components for performing the second-stage banding process are the central processing unit ("CPU") 42 and the video memory devices 44.

The video memory device 44 is essentially a dual-port memory device having a random access memory, or "band RAM" 46, and a serial access memory 48. The band RAM 46 is broken up into a multitude of segments for storing a multitude of image data bands. The preferred image band size is 8K bytes. The serial access memory 48 preferably is sized for one image data band or a fraction of an image data band (such as a half band 4K bytes). The video memory device 44 also includes a random access port 50 for providing dynamic bi-directional access to the band RAM 46, and a serial access port 52 for providing bi-directional serial access to the serial access memory 48. The video RAM devices 44 allow for bi-directional transfer of the entire contiguous block of the serial access memory 48 to and from the band RAM 46 in a single atomic operation. The operation of transferring an image data band, or fractional size thereof, between the serial access memory 48 and the band RAM 46 is referred to as "PASSING." Furthermore, the video RAM devices 44 include fully asynchronous and simultaneous, bi-directional, dual port access to the random access port 50 and to the serial access port 52. Therefore, the video RAM devices 44 allow for data transfer on the random access port 50 to be performed simultaneously with a serial data transfer on the serial access port 52.

In the preferred embodiment, the video memory device 44 comprises an array of NEC Electronics μPD482235LE, video RAM devices. The band RAM 46 storage capacity provided by the NEC μPD482235LE devices are sized for 256 8K byte image data bands or 2M bytes of RAM. The eight μPD482235LE devices provide for a serial access memory 48 size of 4k bytes, which requires that the image data bands be transported to and from the serial access port 52 at half-band sized fractions.

The video memory devices 44 transport the image data bands, or fractional portions thereof, to the TABs 14, and subsequently to the marking engines 12, through a series of dispatch FIFOs 54 via a serial bus ("SAM" bus) 56. It is noted that, although the transfer of bands via the SAM bus is conceptually one band at a time, the hardware limitations might require (or it may simply be more desirable) that the image data bands be transported via the SAM bus 56 in fractional increments thereof. Therefore, the image data band, or the contiguous fractional portion thereof, to be transported via the SAM bus 56 is hereinafter referred to as a "band envelope." The operation of transmitting the band envelopes to the dispatch FIFO's, and subsequently to the marking engines, is referred to as "DISPATCHING." Also, for purposes of this disclosure, an "image data block" is a contiguous block of raster bit-map data which can either be an image data band or a band envelope.

A mass storage device 40 is also coupled to the SAM bus 56. The mass storage device 40 is preferably an array of Dram SIMM memory modules (equalling 4 G bytes of memory), but can also be any type of memory storage device such as a hard disk, flash memory devices, CD ROM devices, disk arrays, or any combination thereof. While the size of the mass storage is limited to the CPU's 42 logical address range, the range can be expanded via an external paging mechanism. If necessary, an optional on-the-fly data compression/decompression front end interface (not shown) may be coupled between the serial access port 52 and the mass storage memory 40 on the SAM bus 56.

The mass storage 40 is provided such that band envelopes of pre-ripped image data bands can be transferred from the serial access port 52 to the mass storage via the SAM bus 56. This operation is referred to as "STORING". When a band envelope of a pre-ripped image data band, STORED in mass storage, is required for additional processing in band RAM (i.e. merging variable data into the pre-ripped image data band), the band envelope is transferred back to the serial access port 52. This operation is referred to as "LOADING." After the LOADING operation the band envelope is then PASSED into band RAM 46 from the serial access memory 48.

The second stage banding operation of the GPU 34 is controlled by the CPU 42. In the preferred embodiment, the CPU is an AMD 29000 32-bit RISC CPU. An arithmetic logic unit ("ALU") 57 is preferably coupled between the central processing unit 42 and the random access port 50 of the video memory device 44 on a CPU data bus 58. Also included in the GPU architecture 34, is a SAM controller 60 and an ALU controller 62.

The dual port ALU 57 performs logical operations in hardware on CPU data transmitted over the CPU data bus 58 into CPU data-in port 59, on band RAM memory data from the random access port 50 sent to the memory-in port 61. It is also within the scope of the invention that the ALU be a triple-port (or multiple port) device, such that the ALU 57 may also have the capability to perform logical operations on data received on additional input ports (not shown), such as background tile data received from a CPU loaded tile register (not shown).

The ALU 57 performs read-modify-write updates to the dynamic band RAM 46 memory whenever the CPU 42 performs a data write with ALU logic mode enabled. The operation of reading, modifying, and writing bits to an image data band in the band RAM 46, by the CPU 42 and the ALU 57 is referred to as "MAPPING". Preferably, the size of each MAPPING operation is the width of the CPU data bus 58, which in the preferred embodiment is 32 bits.

The MAPPING operation, although initiated by the CPU 42 and performed by the ALU 57, is controlled by the ALU controller 62. The CPU transmits band RAM addresses 64 and control commands 66 to the ALU controller 62. The ALU controller 62, in turn sends the logic mode enable commands 68 to the ALU 57. The ALU controller also generates all random access memory controls and addresses 72, 74 sent to the video RAM device 44, and generates the data transfer control signal 76 to control the PASSING operations of band envelopes between the random access memory 46 and the serial access memory 48 in the video RAM devices 44.

The SAM controller 60 receives commands via the CPU data bus 58 when addressed by the CPU 42. The SAM controller is responsible for transporting band envelopes, via CPU initiation, between the serial access port 52, the dispatch FIFOs 54, and the mass storage devices 40. The SAM controller controls the STORING of band envelopes from the serial access port 52 to the mass storage device 40, controls the LOADING of band envelopes from the mass storage device 40 to the serial access port 52, controls the DISPATCHING of band envelopes from the serial access port to the dispatch FIFOs 54, and also controls the DISPATCHING of band envelopes from the mass storage 40 to the dispatch FIFOs 54. In controlling the STORING, LOADING and DISPATCHING operations, the SAM controller utilizes SAM control signals 78, mass storage control signals 80, and generates mass storage addresses 82.

In the preferred embodiment, the DISPATCHING, LOADING and STORING of band envelopes occurs in one-half image data band increments, and therefore, in the preferred embodiment a band envelope is sized as one-half band. To simplify LOADING and STORING operations, page-maps may be increased in size such that the memory required for the entire page-map equals an exact integer multiple of image data bands. A "sub-band." an image data block smaller than a band envelope, however, is usually DISPATCHED during the "last band of printed page block move." This is because the amount of digital bit map data that represents an actual printed page rarely resides on an integer multiple of image data bands. Thus, the last band envelope of the printed page is usually smaller than a full size band envelope. The SAM controller also adds an end-of-page (EOP) framing bit to the end of the sub-band, when the sub-band is DISPATCHED to the FIFO. This framing bit (EOP) ultimately propagates along with the bit map image to the marking engine signaling the printed page boundary.

The CPU commands, sent to the SAM controller 60, specify the image data block move size, the block move source and destination, the mass storage start address (the start of the band envelope derived from the CPU's logical address register 87) of a block move, and the EOP bit generation DISPATCH to the dispatch FIFOs. The CPU also sends a GO command to start the SAM controller block move operation. The SAM controller 60 is responsible for sending interrupts to the CPU, such as the "SAM block move complete" interrupt 84 and the "dispatch FIFO half empty" interrupt 86 (as described below).

The GPU architecture 34 includes one dispatch FIFO 54 for each print engine or one FIFO for each color of a multi-color print engine. The FIFO size is preferably twice the actual band envelope size. Therefore, in the preferred embodiment, the actual size of each dispatch FIFO 54 is one band since the preferred band envelope size is one-half an image data band. If the architecture were configured such that the band envelope were one image data band, then the dispatch FIFO size would be two image data bands.

Each dispatch FIFO 54 receives control signals 88, such as End-Of-Page 90 and FIFO Write 92, from the SAM controller. Band envelopes are DISPATCHED to the dispatch FIFO 54 via the SAM bus 56. The marking engine may start to retrieve a band envelope, from the dispatch FIFO when any portion of the band envelope is present in the dispatch FIFO. The dispatch FIFO 54 sends a "half empty" flag, as FIFO status 96, to the SAM controller 60, which provides the SAM controller with information for subsequent DISPATCHES. Upon receipt of an active "half empty" flag 96 after a complete DISPATCH operation, the SAM controller transmits to the CPU 42 the "dispatch FIFO half empty" interrupt 86 so that the CPU knows that the FIFO(s) are prepared to receive another band envelope DISPATCH. Note that DISPATCHES to the FIFO(s) run at full SAM bandwidth and are not dependant upon the marking engine's speed. This means that the present invention can DISPATCH to the FIFO(s) whenever the FIFO(s) are ready to receive another band envelope, independent of the speed of the marking engines.

In the preferred embodiment the dispatch FIFOs 54 are AMD AM7203A FIFOs. If necessary, an optional data decompression device (not shown) may be coupled between the dispatch FIFOs 54 and the TABs 14. Furthermore, it may be desireable to install an N:1 multiplexor (not shown) before the FIFOs 54 to funnel the SAM bus to a smaller size. For example, using an 2:1 multiplexor to convert a very wide 64 bit SAM bus to a 32 bit bus. Use of such a multiplexor would help simplify PCB board layout, while not compromising the architecture's performance.

The GPU's second stage banding architecture 34 preferably utilizes virtual memory management capabilities between the CPU 42, the video RAM devices 44 and the mass storage 40. The virtual memory mapping is controlled by a translation look aside buffer 98, which in the preferred embodiment, is contained in the CPU 42. The CPU in requesting MAPPING operations generates, through a logical address register 87, logical addresses 100 to the mass storage device 40 which are intercepted by the TLB 98. The TLB has a translation table which contains a translation of the logical addresses of the mass storage device to the physical addresses in the band RAM 46 in the video memory devices 44. Every time a band envelope is LOADED from mass storage 40 into the band RAM 46, the translation table in the translation look aside buffer 98 is updated to provide a physical translation for the logical address of the band envelope which was loaded to the dynamic band RAM 46. Therefore, the CPU merely addresses to the mass storage device 40 while the TLB 98 performs the actual physical addressing operations. If the CPU addresses a band envelope in which the translation table does not have a translation (which means that the band envelope accessed by the CPU has not been LOADED into the dynamic band RAM), the TLB will generate a page fault 102 indicating that the CPU must initiate a LOADING operation for that particular data image band to the SAM controller 60. Once the LOADING operation is complete the translation table in the TLB 98 will be updated and the CPU will be provided physical access to that band envelope in the dynamic band RAM 46. Therefore because of this virtual memory management system, the CPU is free to concentrate on the MAPPING operations, while off-loading the STORING, DISPATCHING and LOADING operations to the SAM controller 60.

In the preferred embodiment, the SAM controller 60 is a custom designed ASIC device, however, it is within the scope of the invention that the SAM controller may be any micro-controller, microprocessor, custom designed device, or circuit. Preferably, the SAM controller is designed or programmed to operate as generally depicted in the flow diagram of FIG. 4.

Figure 4:
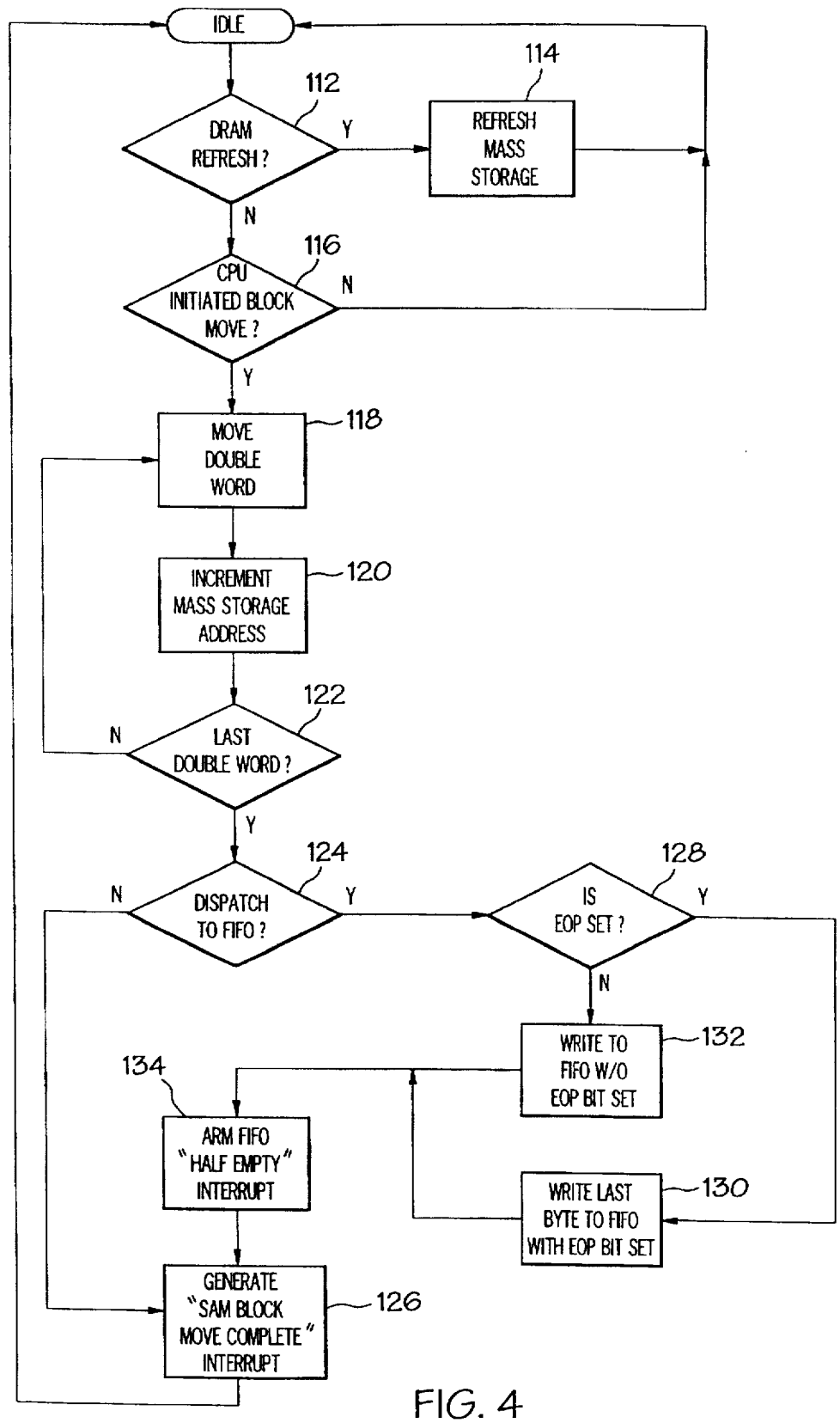
FIG. 4 is a flow chart of SAM controller functions used in the present invention.

As shown in FIG. 4, in Step 110, the SAM Controller 60 is in an idle state. In this idle state, the SAM Controller is waiting for a CPU "image data block move" command to be transmitted to the SAM Controller over the CPU data bus 58. Prior to an "image data block move" command, the CPU will specify "block move source/destination," "block move size," "mass storage start address of band," and "EOP frame bit for dispatch FIFO." Periodically, while in this idle state, the SAM controller may perform a "DRAM refresh" to mass storage 40 by advancing to Step 114, and upon completion, will return to Step 110. If, while in the idle state, the CPU sends a command, then in Step 116, the SAM Controller determines whether the CPU command is for a CPU initiated image data block move. If not, the SAM controller returns to the idle state 110. Otherwise, the SAM Controller advances to Step 118.

Step 118 begins a continuous operation, or loop, for performing transfers double-words (or whatever data transfer size the hardware allows) of the image data blocks until the entire image data block is transferred. Depending upon the source and destination specified prior to the "image data block move" command, this block move can be either a LOADING, STORING or DISPATCHING operation. In Step 118, the SAM Controller moves a double-word of data between the source and destination. In Step 120, if the mass storage device 40 is included in the data transfer operation, the SAM Controller increments the mass storage address, Step 122 determines if the double word transferred by the SAM Controller is the last double word. If not, the SAM Controller operation loops to Step 118 to perform the next double-word transfer. Therefore, Steps 118–122 will be repeated until the last double-word of the image data block has been transferred.

When Step 122 determines that the SAM Controller has moved the last double-word, the SAM Controller advances to Step 124 to determine whether the SAM Controller is dispatching to the FIFOs 54. If not dispatching to the FIFOs 54, the SAM Controller advances to Step 126 which generates the SAM block move complete interrupt 84 which is sent to the CPU. Otherwise, if the SAM Controller is dispatching to the FIFO 54, the SAM Controller in Step 128 next determines whether the EOP bit is set. If the EOP bit is set, the SAM Controller moves onto Step 130 which writes the last byte to the FIFO with the EOP bit set. If the EOP bit is not set in Step 128, the SAM Controller moves on to Step 132 to write the last byte to the FIFOs 54 without the EOP bit set. After Step 130 or Step 132, the SAM Controller has dispatched an entire band envelope to the dispatched FIFOs 54; thus, in Step 134, the SAM Controller arms the FIFO half-empty interrupt 86. At this point; a FIFO half-empty interrupt may fire whenever the dispatch FIFO half-empty flag is active. The SAM Controller then moves onto Step 126 to generate the SAM block move complete interrupt 84; and subsequently, returns to the idle state, step 110.

In the preferred embodiment, the ALU controller 62 is a custom designed ASIC device, although the ALU controller may be any micro-controller, microprocessor, custom designed device, or circuit. Preferably, the ALU controller is designed or programmed to operate as generally depicted in the flow diagram of FIG. 5.

Figure 5:
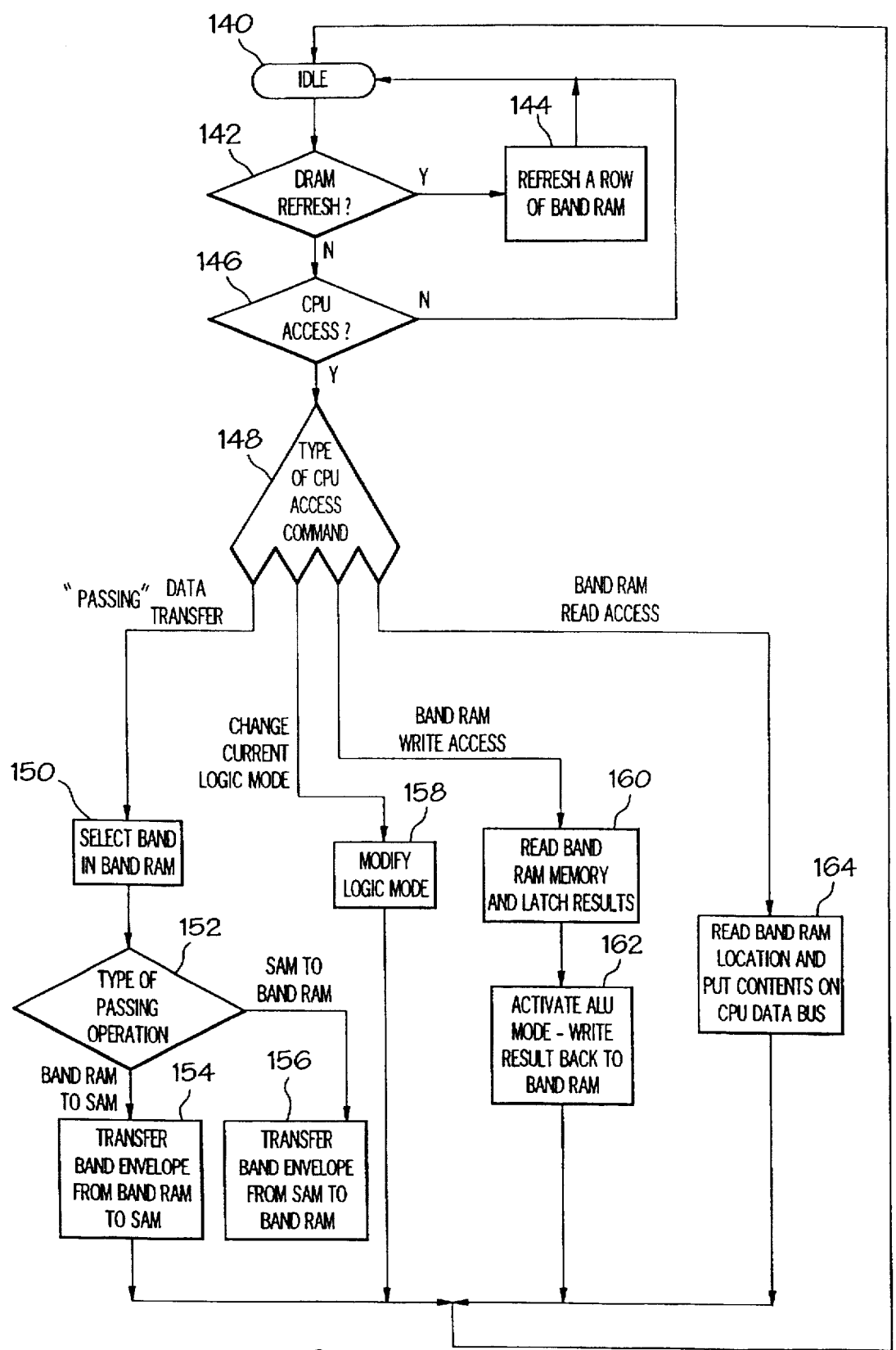
FIG. 5 is a flow chart of ALU controller functions used in the present invention.

As shown in FIG. 5, in the idle state, Step 140, the ALU Controller 62 waits for a CPU command from the CPU control lines 66. Periodically, while in this idle state, the ALU controller performs a "a Band RAM refresh" to band RAM 46 by advancing to Step 144, and upon completion, will return to Step 140.

If, in Step 142, the ALU Controller determines that a "band RAM refresh" is not required, the ALU Controller advances to Step 146 to determine whether a CPU command is pending. If not, the ALU Controller returns to Step 140; on the other hand, if there is a "CPU access" command pending, then in Step 148, the ALU Controller determines whether the "CPU access" command is for one of the following: a PASSING operation, a "change current logic mode" operation, a "band RAM write access" or MAPPING command or a "band RAM read access" command.

If the CPU command, in Step 148, is for a PASSING operation, the ALU Controller advances to Step 150, in which the particular band, as specified by the CPU address, is selected in band RAM 46. In Step 152, the ALU Controller determines whether the PASSING operation is from band RAM 46 to serial access memory 48, or whether the PASSING operation is from the serial access memory 48 to band RAM 46. If the former, the ALU Controller advances to Step 154 to PASS the image data envelope from band RAM 48 to the serial access memory 48; however, if the latter, the ALU Controller advances to Step 156 to transfer the image data envelope from serial access memory 48 to band RAM 46. Upon completion of Steps 150 or 156, the ALU Controller returns to the idle state, Step 140.

If, in Step 148, the ALU Controller determines that the "CPU access" command is a "change current logic mode" command; then in Step 158, the ALU Controller modifies the current logic mode and then returns to the idle state in Step 140.

If, in Step 148, the ALU Controller determines that the "CPU access" command is a "band RAM write access" or "MAPPING" command, the ALU Controller advances to Step 160 to read a 32-bit word from band RAM memory 146 and to latch the results of the read. Then, in Step 162, the ALU Controller activates the ALU logic mode and performs a logic operation specified by the current logic mode on the latched data read from Band RAM. This logic operation can be performed using data on the CPU data bus and/or using data read from an optional third port, such as a tile register. Upon completion of the logic operation, the ALU controller returns the result of the logic operation into band RAM 46. After Step 162, the ALU Controller returns to the idle state in Step 140.

Finally, if in Step 148, the ALU Controller determines that the "CPU access command" was for a "band RAM read access" command, the ALU Controller will advance to Step 164. In Step 164, the ALU Controller reads the contents of a band RAM location in band RAM 46 and transfers the contents onto the CPU data bus 58 for reading by the CPU. After Step 164, the ALU Controller returns to the idle state in Step 140.

The system architecture of the present invention therefore allows the CPU 42 to perform rendering or MAPPING operations on page-map images "on the fly" in band RAM 46, while simultaneously DISPATCHING a completed or rendered band envelope to the marking engine via the dispatch FIFO 54. The architectural advantage of this invention is that the DISPATCHING from the serial access port 52 is occurring in parallel, and simultaneous to, the MAPPING of image data bands in the band RAM 46. Another architectural advantage of the present invention is, with the inclusion of the mass storage 40, the CPU has the ability to initiate DISPATCHES from the serial access port 52 to either the mass storage 40 or the dispatch FIFO 54; and furthermore, the CPU has the ability to initiate LOADING of band envelopes from the mass storage 40 to the serial access port, and has the ability to initiate STORING of band envelopes from the serial access memory to the mass storage. The ability, provided by the architecture, to enable the CPU to initiate DISPATCHING, LOADING, and STORING operations utilizing a mass storage device 40; and the ability, provided by the architecture, for the DISPATCHING, LOADING, and STORING operations to be occurring in parallel with the MAPPING operation; enables the CPU to merge variable bit-map data into boilerplate page-maps at very high speeds, thus creating a "variable postscript high speed printing controller." Finally, the architecture provides true image banding such that the controller allows creation of very large image pages, such as banners, without concern for the size of band RAM.

A method for utilizing the architecture of the present invention to merge variable bit-map data with boilerplate page-maps can be illustrated by way of example. In this example, suppose the print operation is to merge variable images to a set of ten pre-printed forms. A job file containing all the rendering information the (PDL files) to generate the 10 boilerplate forms, having selected areas defined for adding the variable images, is first transmitted to the CPU. Also available to the CPU is a file which defines all of the variable information to be merged into the boilerplate page-maps, such as a data base having addresses, names, or other information particular to a certain party of client; and may also contain particular engine perimeters, i.e., printer specific commands such as the width, resolution, color, etc. of the variable images.

The CPU will first build the bit-maps in band RAM 46 for the boilerplate page-maps in accordance with the rendering commands that are generated from the PDL file. The MPU sorts the rendering commands during first stage banding. The rendering commands are then sent to the CPU. The first boiler plate template will be rendered or MAPPED in band RAM 46, one image data band at a time. These image data bands of boilerplate data are referred to as "pre-ripped" image data bands.

Upon completion of the rendering of an image data band, the CPU will initiate the ALU controller 62 to PASS a band envelope of the pre-ripped image data band to the serial access port 48. From there, the CPU will initiate the SAM controller 62 to STORE the band envelope in mass storage 40. If the band envelope is a fraction of an entire image data band, the PASSING and STORING operations will be repeated until the entire band is stored in mass storage. Concurrently with the PASSING and STORING operations initiated by the CPU, the CPU is MAPPING the next image data band of the page-map in the band RAM 46.

Upon completion of MAPPING the first boilerplate page-map, and upon STORING the entire contents of the page-map in mass storage 40, the CPU then repeats the MAPPING and STORING operations for the next nine boilerplate pages in the same manner. It is noted here, that the architecture of the present invention allows for these MAPPING and STORING operations to be occurring in parallel.

Next, the CPU accesses files containing the variable image data information. Based on the information in this file, the CPU is informed where to the insert the variable bit map-data. Knowing the logical address in mass storage 40 where a particular pre-ripped image data band (into which variable data needs to be merged) resides, the CPU will attempt to perform a MAPPING operation on that image data band. The TLB 98 intercepts the address sent by the CPU to the ALU controller 62, to see if the particular image data band is presently located in band RAM 46. If not, the TLB will send a page fault interrupt 102 to the CPU. Upon receiving the page fault interrupt, the CPU initiates the SAM controller 60 to perform LOADING and PASSING operations to transfer the particular image data band into band RAM 46. The CPU then updates the translation table in the TLB 98 to indicate that the particular image data band is present in band RAM. It is at this point when the MAPPING operation to merge the variable image data to the pre-ripped image data band is commenced.

Once the variable bit-map data is MAPPED to the particular image data band, that image data band is ready for DISPATCH to the print engine. Alternatively, the image data band may be STORED back into mass storage if desired.

The CPU merges the variable image data to the ten pre-ripped page maps as described above. Simultaneously to the MAPPING operations, the CPU is initiating DISPATCHING operations for the merged image data bands to the dispatch FIFO 54. Furthermore, if there is a pre-ripped image data band in which no variable data needs to be merged to, the MAPPING operation can be bypassed and that image data band can be immediately DISPATCHED from the mass storage 40 to the dispatch FIFO 54.

Having described the invention in detail and by reference to the drawings, it will be apparent that modification and variations are possible without departing from the scope of the invention as defined in the following claims.

What is claimed is:

1. An apparatus for processing raster page-map data for transmission to a marking engine, the page-map data being broken up into a plurality of non-overlapping, contiguous raster image data blocks, the apparatus comprising:

a central processing unit;

a dual-port memory device having a dynamic band RAM for storing a plurality of image data blocks, and a serial access memory for storing at least one image data block;

mapping means, initiated by said central processing unit, for reading an image data block from said dynamic band RAM, modifying the image data block and writing the image data block back to said dynamic band RAM; and dispatching means, initiated by said central processing unit, for transferring another image data block from said serial access memory to the raster printer;

wherein said mapping means and said dispatching means are performed in parallel.

2. The apparatus of claim 1, further comprising:

passing means, initiated by said central processing unit, for transferring an image data block between said dynamic band RAM and said serial access memory.

3. The apparatus of claim 2, further comprising:

a memory device for storing a multitude of image data blocks; and loading means, initiated by said CPU, for transferring an image data block from said memory device to said serial access memory;

wherein said mapping means and said loading means are performed in parallel.

4. The apparatus of claim 3, further comprising:

storing means for transferring an image data block from said serial access memory to said memory device;

wherein said mapping means and said storing means are performed in parallel.

5. The apparatus of claim 4, wherein said dispatch means is further configured to transfer an image data block from said memory device to the raster printer.

6. The apparatus of claim 5, wherein said dispatching means includes:

a FIFO buffer coupled between said serial access memory and the raster printer; and a serial bus coupled between said serial access memory and said FIFO buffer;

said memory device being coupled to said serial bus.

7. The apparatus of claim 6, wherein said mapping means includes an arithmetic logic unit and a CPU data bus, said CPU data bus being coupled between said central processing unit and said dynamic band RAM, and said arithmetic logic unit being coupled to said CPU data bus.

8. The apparatus of claim 7, further comprising a SAM controller for controlling said dispatching means and said storing means, wherein said SAM controller receives dispatching commands and storing commands from said central processing unit.

9. The apparatus of claim 8, further comprising an ALU controller for controlling said mapping means, wherein said ALU controller receives mapping commands from said central processing unit.

10. A controller for processing raster page-map data for transmission to a marking engine, the page-map data being broken up into a plurality of non-overlapping, contiguous raster image data blocks, the apparatus comprising:

a central processing unit;

at least one video RAM device, each video RAM device including a dynamic band RAM, a serial access memory, a random access port for transmitting and receiving image data blocks to and from said dynamic band RAM, and a serial port for transmitting and receiving image data blocks to and from said serial access memory;

a CPU data bus coupled between said central processing unit and said random access port, for providing access to said dynamic band RAM by said central processing unit;

a dispatch FIFO coupled to the marking engine for transmitting the image data blocks to the marking engine; and a serial bus connected between said dispatch FIFO and said serial port;

said video RAM devices transfer image data blocks bi-directionally between said dynamic band RAM and said serial access memory; and said video RAM devices simultaneously transfer image data blocks both to and from said serial port and to and from said random access port;

whereby the controller allows transferring of image data blocks from said serial access memory to said dispatch FIFO, while simultaneously allowing access to image data blocks in said dynamic band RAM by said central processing unit.

11. The controller of claim 10, further comprising an arithmetic logic unit coupled to said CPU data bus, said arithmetic logic unit configured to perform logical operations on the image data blocks in said dynamic band RAM upon initiation by said central processing unit.

12. The controller of claim 10, further comprising:

a memory device coupled to said serial bus, said memory device sized for the storage of a multitude of image data blocks;

whereby the controller is further capable of transferring image data blocks from said memory device to said dispatch FIFO, while simultaneously allowing access to image data blocks in dynamic band RAM by said central processing unit; and whereby the controller is further capable of transferring image data blocks from said serial access memory to said memory device, while simultaneously allowing access to image data blocks in said dynamic band RAM by said central processing unit.

13. An apparatus for processing raster page-map data for transmission to a marking engine, the page-map data being broken up into a plurality of non-overlapping, contiguous raster image data blocks, the apparatus comprising:

a central processing unit;

a first memory device, said first memory device being a dual-port memory device having a dynamic RAM for storing a plurality of image data blocks and a serial access memory for storing at least one image data block;

a second memory device for storing a plurality of image data blocks, means, initiated by said central processing unit, for mapping an image data block in said dynamic RAM;

means, initiated by said central processing unit, for dispatching an image data block from said serial access memory to the marking engine, said dispatching means being further configured to dispatch an image data block from said memory device to the marking engine;

means, initiated by said central processing unit, for passing an image data block between said dynamic RAM and said serial access memory;

means, initiated by said central processing unit, for loading an image data block from said memory device to a serial access memory;

means for storing an image data block from said serial access memory to said memory device; and a translation look aside buffer, said translation look aside buffer translates a logical address, sent by said central processing unit, to an image data block in said second memory device, into a physical address in said dynamic RAM;

wherein said mapping and said dispatching are performed in parallel.

14. The apparatus of claim 13, wherein said translation look aside buffer generates a memory fault when said translation look aside buffer cannot translate a logical address to an image data block in said memory device, sent by said central processing unit, into a physical address in said dynamic band RAM.

15. A controller for processing raster page-map data for transmission to a marking engine, the page-map data being broken up into a plurality of non-overlapping, contiguous raster image data blocks, the controller comprising:

a central processing unit;

at least one video RAM device including a dynamic band RAM, a serial access memory, a random access port for transmitting and receiving image data blocks to and from said dynamic band RAM, and a serial port for transmitting and receiving image data blocks to and from said serial access memory;

a CPU data bus coupled between said central processing unit and said random access port, for providing access to said dynamic band RAM by said central processing unit;

a dispatch FIFO coupled to the marking engine for transmitting the image data blocks to the marking engine;

a serial bus connected between said dispatch FIFO and said serial port;

a mass memory device coupled to said serial bus, said mass memory device sized for the storage of a multitude of image data blocks; and a translation look aside buffer, said translation look aside buffer translates logical addresses to said mass memory device generated by said central processing unit into physical addresses to said dynamic band RAM;

said video RAM devices transfer image data blocks bi-directionally between said dynamic band RAM and said serial access memory; and said video RAM devices simultaneously transfer image data blocks to and from said serial port and to and from said random access port;

whereby the controller allows dispatching of image data blocks from said serial access memory, while simultaneously allowing mapping of image data blocks in said dynamic band RAM;

whereby the controller is further capable of dispatching image data blocks from said mass memory device, while simultaneously mapping image data blocks in dynamic band RAM;

whereby the controller is further capable of storing image data blocks from said serial access memory to said mass memory device, while simultaneously mapping image data blocks in said dynamic band RAM; and whereby said central processing unit provides addresses to said mass memory device and said translation look aside buffer performs actual physical addressing operations.

16. The controller of claim 15, wherein said translation look aside buffer contains a first physical address translation corresponding to a first logical address to an image data block which has been loaded from said memory device into said dynamic band RAM.

17. The controller of claim 16, wherein said translation look aside buffer generates a memory fault when said central processing unit generates a logical address to a second image data block address of which said translation look aside buffer does not contain a second physical address translation.

18. The controller of claim 17, further comprising a means for loading said second image data block from said memory device to said dynamic band RAM in response to said memory fault.

19. The controller of claim 18, further comprising an arithmetic logic unit coupled to said CPU data bus, said logic unit, upon initiation by said central processing unit, performs logical operations on the image data blocks in said dynamic band RAM.

20. A controller for processing raster page-map data for transmission to a marking engine, the page-map data being broken up into a plurality of non-overlapping, contiguous raster image data blocks, the controller comprising:

a dynamic band RAM;

a memory device coupled to said dynamic band RAM by a data bus;

a central processing unit for mapping image data blocks in said dynamic band RAM, said central processing unit addressing an image data block by generating a logical address to said memory device; and a translation look aside buffer configured to translate said logical address generated by said central processing unit into a physical address to said dynamic band RAM.

* * * * *